Nov. 11, 1958 H. T. TORNBERG 2,859,475
ADJUSTABLE EXTRUSION DIES
Filed Aug. 21, 1956
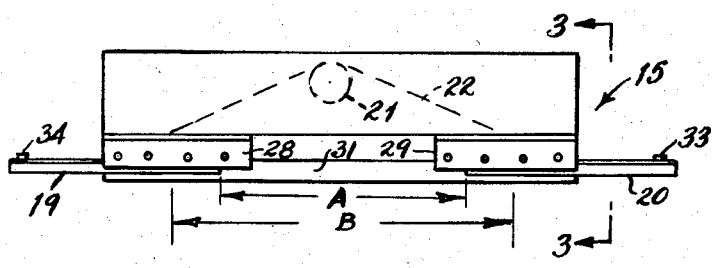
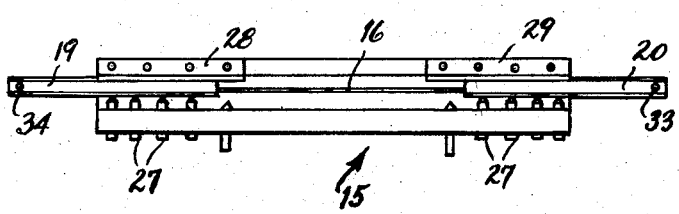
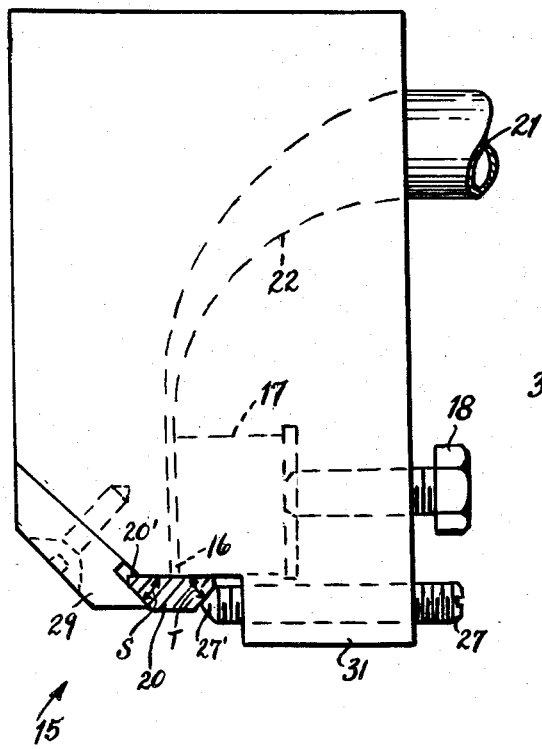
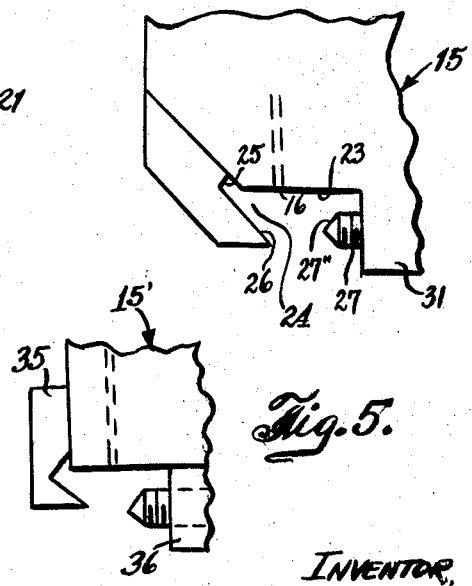
INVENTOR,
HENNING T. TORNBERG
by
Attorney 2,859,475

ADJUSTABLE EXTRUSION DIES

Henning T. Tornberg, Ridgewood, N. J., assignor to Modern Plastic Machinery Corp., Lodi, N. J., a corporation of Delaware Application August 21, 1956, Serial No. 605,296

1 Claim. (Cl. 18—12)

The present invention relates to extrusion dies for plasticized material and more particularly to means for closing or blocking portions of its discharge orifice. It is adaptable for example for a die for the extrusion of a web, to block or close the ends of its discharge orifice to alter the width of the web to be extruded. The orifice-closing members may be slidable before being locked in place, so that width of web can be made any dimension up to maximum offered by the die.

The principal object of this invention is to provide a novel and improved orifice-closing means of the character mentioned, which is leak-proof.

Another object hereof is to provide an orifice closing means of novel and improved construction for the purpose set forth, which has a new mode of operation.

A further object thereof is to provide a novel and improved adjustably closable extrusion die of the nature described, wherein the orifice-closing member or members are easily movable to their required position to block predetermined portions of the discharge orifice and then securely locked in their set positions to effect leak-proof blocking.

Still a further object is to provide a novel and improved orifice-opening adjustment means for an extrusion die, which is simple in construction, reasonably cheap to make, easy to use, adaptable as an attachment on many existing dies, and which is efficient in carrying out the purposes for which it is designed.

Other objects and advantages will become apparent as this disclosure proceeds.

For the practice of this invention, one form it may assume, is to have the discharge orifice open in a flat surface of the die body. A bar along one side of the orifice is secured to the die body or may be integral therewith. This bar presents a lengthwise flat surface. Such flat surfaces are in angular relation and constitute the inside surfaces of a channel along the orifice. There is an orifice-blocking member having two flat surfaces in said angular relation as mentioned, lying within said channel so that the surfaces of said channel are in contact respectively with said surfaces of the orifice-blocking member and means are provided at the other side of the discharge orifice to releasably hold the blocking member tightly within the channel and to press it with force to maintain the contacting surfaces securely against each other. The channel may have a lengthwise gutter which deepens it; at least one of said surfaces of the blocking member being exposed in said gutter. The blocking member is set to close a portion of the discharge orifice. When the die is for the extrusion of a web, each end portion of discharge orifice may have associated therewith a blocking or closing member which may be a rod slidably positionable along the channel and then locked into a set position, according to the width of web desired.

A preferred arrangement for securely locking the closure member in place, is to have such member of dove-tail cross section or other form having three surfaces whose planes determine a triangular prism. One track for such member is the channel, while the other track as shown herein, is offered by the slant of the conical ends of screws threadedly mounted on the die body. These screws extend preferably parallel to the die surface in which the discharge orifice opens.

In the accompanying drawings forming part of this specification, similar characters of reference indicate corresponding parts in all the views.

Fig. 1 is a front view of a die for extruding a plastic web and embodying the teachings of this invention.

Fig. 2 is a bottom view thereof, shown in part.

Fig. 3 is an enlarged section taken at lines 3—3 in Fig. 1.

Fig. 4 shows a fragment of Fig. 3.

Fig. 5 is like Fig. 4, but of a slightly modified form.

In the drawings, this invention is illustrated as applied to a die 15 for the extrusion of a web. Hence, the discharge orifice 16 is long and narrow. In the embodiment shown, the width of the orifice is adjustable by setting the lengthwise bar 17 by means of the adjustment screws 18, thereby determining the thickness of the web. The length of said orifice is adjustable by blocking end portions thereof by means of the orifice-closing bars 19 and 20, thereby adjusting the width of such web to be extruded. Said die 15, of course, has an intake port 21 for the admission of a constant supply of plasticized material, from where it is led through a passage 22 to the discharge orifice 16.

This invention is concerned with the orifice-closing bars 19, 20 and the means for locking same in place so that the width of web can be made any dimension "A" which is less than maximum, the length "B" of orifice 16. This will now be described.

The orifice opening is in the flat surface 23 of the die body. The orifice-closing bars 19, 20, each have three surfaces whose planes determine a triangular prismatic form. It is preferred that said closing bars shall be of dove-tail cross-section as shown, positioned with the base of the trapezoidal form in surface contact with the flat surface 23 and across the discharge orifice 16 at its end regions respectively.

One track for the bar 20 is offered by the channel 24 which is lengthwise along and to one side of the discharge orifice 16. This channel is deepened by a lengthwise gutter 25. This exposes an edge lane of one of the surfaces of the rod 20 as at 20'. It also assures good fit of said rod against the inner surfaces 23 and 26 of the walls of the channel 24 and offers relief from foreign particles which would mar surface contact of said bar as required. What might be called the other track for the bar 20, is provided by having the surface 30 thereof rest tangent to the slant heights 27" of the conical tips 27' of the adjustment screws 27. These screws are threadedly engaged in the die body, through a bar structure 31 therealong and extend perpendicular to the length of the rod 20, parallel to the die surface 23, with their conical tips 27' in space at the other side of the discharge orifice 16. This is a preferred position for said screws. There are a plurality of such screws for each of the bars 19, 20 in the illustrated embodiment, in spaced relation along such bars. The associated track structure as described for the bar 20, is of course likewise provided for the bar 19. The channel 24 may be along the entire orifice 16, or may extend a predetermined length inward from each end of the orifice, as for instance as shown provided by the members 28, 29, so that the length of the orifice can be adjusted within prescribed limits. The bars 19, 20 may each be of dove-tail cross-section as shown, where angled "S" and "T" are acute angles. The longitudinal edges of the bars 19, 20 are preferably chamfered.

It is evident that upon loosening the screws 27, the orifice-closing rods 19 and 20 are free to slide. They may have handle means 33, 34 for such purpose and are set to any required distance apart "A." Then the screws 27 are tightened and the die will extrude a web of width "A."

A die 15' already in existence can be easily fitted for the practice of this invention, by providing the bars 35, 36 and appurtances.

This inventon is capable of various forms and numerous applications without departing from the essential features herein disclosed. It is therefore intended and desired that the showing herein be deemed illustrative and not restrictive and that the patent shall cover all patentable novelty herein set forth; reference being had to the following claim rather than to the specific description herein to indicate the scope of this invention.

I claim:

In a die for extruding a plastic mass of a predetermined cross-section, a body member having an exterior first flat surface, a discharge orifice of such cross-section opening in said surface and a passage to receive and lead plasticized material out of said body member through said orifice, a first member fixed on said body member, positioned to one side of the discharge orifice, presenting a second flat surface in a predetermined acute angular regulation with the first flat surface whereby said flat surfaces are the inner surfaces of the walls of a channel along the orifice, a second member fixed on said body member positioned to the other side of said discharge orifice and opposite said first member, a screw extending through said second member and in threaded engagement therewith; the longitudinal axis of said screw being substantially parallel to said first surface and substantially perpendicular to the line of intersection of the planes of the surfaces of the walls of said channel whereby one end of said screw is between said first and second members; said end of the screw being conical and an orifice-closing member having two exterior flat surfaces in the mentioned angular relation of the surfaces of the walls of the channel, lying within said channel whereby said surfaces of the closing member are respectively in contact with the said inner surfaces of the channel and one of said surfaces of the closing member is across part of said discharge orifice; said closing member having a third flat surface in acute angular relation with its other two mentioned surfaces; said three surfaces of said closing member determining a triangular prismatic form; said screw holding the closing member within said channel; the conical end of said screw being in contact along its slant line with said third flat surface of the closing member.

References Cited in the file of this patent
UNITED STATES PATENTS 1,350,722    Goodenberger _____ Aug. 24, 1920